C. F. HEATH.
Oil-Can.
No. 225,825. Patented Mar. 23, 1880.
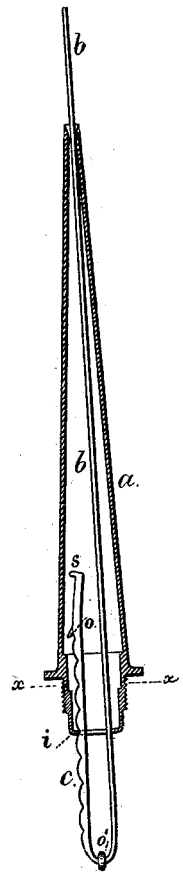
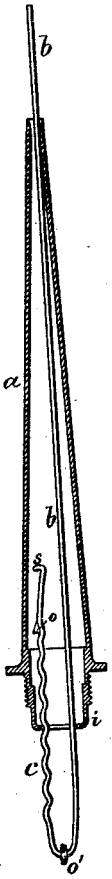
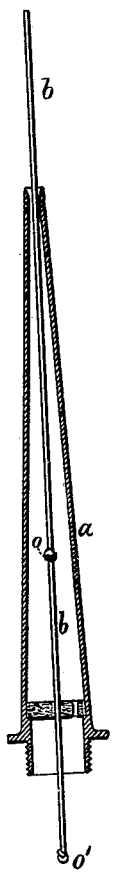
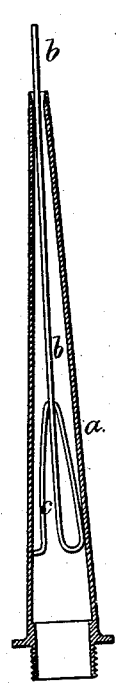
Witnesses
Chas H. Smith
Geo. T. Pinckney
Inventor
Charles F. Heath
per Lemuel W. Serrell
Atty

UNITED STATES PATENT OFFICE.

CHARLES F. HEATH, OF WEST NEW BRIGHTON, NEW YORK.

OIL-CAN.

SPECIFICATION forming part of Letters Patent No. 225,825, dated March 23, 1880.

Application filed February 2, 1880.

*To all whom it may concern:*

Be it known that I, CHARLES F. HEATH, of West New Brighton, in the county of Richmond and State of New York, have invented an Improvement in Oil-Cans, of which the following is a specification.

This invention relates to a device for directing the lubricating-oil to the particular part of the machine or apparatus requiring one or more drops, instead of ejecting a small stream of oil from the nozzle, thus saving oil and insuring the lubrication of the proper part only.

Before my invention the nozzle of the oil-can had been provided with a wire passing down through the nozzle and connected to a valve, so that the contact of the wire with the article to be lubricated would close an inlet air-valve, and thus prevent too great a flow of oil.

I make use of a movable wire passing longitudinally of the nozzle and provided with a holding-spring that keeps the wire in any position to which it may be moved, thus allowing the wire to be drawn out of the nozzle more or less, so as to act as a conveyer of the oil to whatever part the end of the wire comes into contact. Hence deep grooves or holes, or places difficult of access, can be lubricated with reliability and without waste of oil.

In the drawings, Figure 1 is a section of the oil-can spout with its conducting-wire. Fig. 2 is a section at the line $xx$ in enlarged size. Fig. 3 shows the holding-spring in a different shape from that in Fig. 1; and Fig. 4 represents the holding-spring in the form of an elastic washer. Fig. 5 represents the holding-spring wire as corrugated.

The nozzle $a$ is to be of any desired size or shape, and it is to be screwed to an oil-can. The end of the nozzle is of a size to allow the wire $b$ to pass through without obstructing the passage for the oil, and I find it preferable to counterbevel the hole at the end of the nozzle by means of a tapering reamer, so that oil upon the surface of the wire will run back into the can, but the metal itself is not spread into a cup-shaped end, as has sometimes been done.

The wire $b$ has a spring end, $c$, that produces friction for holding the wire in any position to which it may be moved endwise of the nozzle. I prefer and use notches, as in Fig. 1, or corrugations, as in Fig. 5, in the wire of the spring $c$, and these, acting within the cross-bridge $i$ of the nozzle, will hold the wire from falling, but will allow of its being either drawn farther out of the nozzle or pushed in. The notch or shoulder at $o$ stops the wire from being pushed entirely in, and insures a sufficient projection beyond the end of the nozzle for it to be grasped and drawn out. If desired, however, the nozzle may be unscrewed and the wire drawn back to the stop $s$, in which case the wire will not interfere with the oil being ejected by pressure from the nozzle.

The wire, when bent in the form shown in Fig. 3, acts as a spring against the inside of the nozzle to hold the wire by the frictional contact with the inside of the nozzle.

Stops at $o'$ may be applied to the wire to limit its end movement.

When the wire $b$ passes through a spring-washer of leather or other suitable material within the spout, as in Fig. 4, the wire will be held thereby in any position to which it is moved, and under all circumstances the wire will act as a conductor for the oil, as aforesaid.

I claim as my invention—

The combination, with the oil-can nozzle, of a wire movable endwise of said nozzle, and a spring to retain such wire in any position to which it may be moved, substantially as set forth.

Signed by me this 28th day of January, A. D. 1880.

CHARLES F. HEATH.

Witnesses:
GEO. T. PINCKNEY,
CHAS. H. SMITH.